July 16, 1929.  W. E. OVER  1,721,500
CLUTCH
Filed March 2, 1927  2 Sheets-Sheet 1
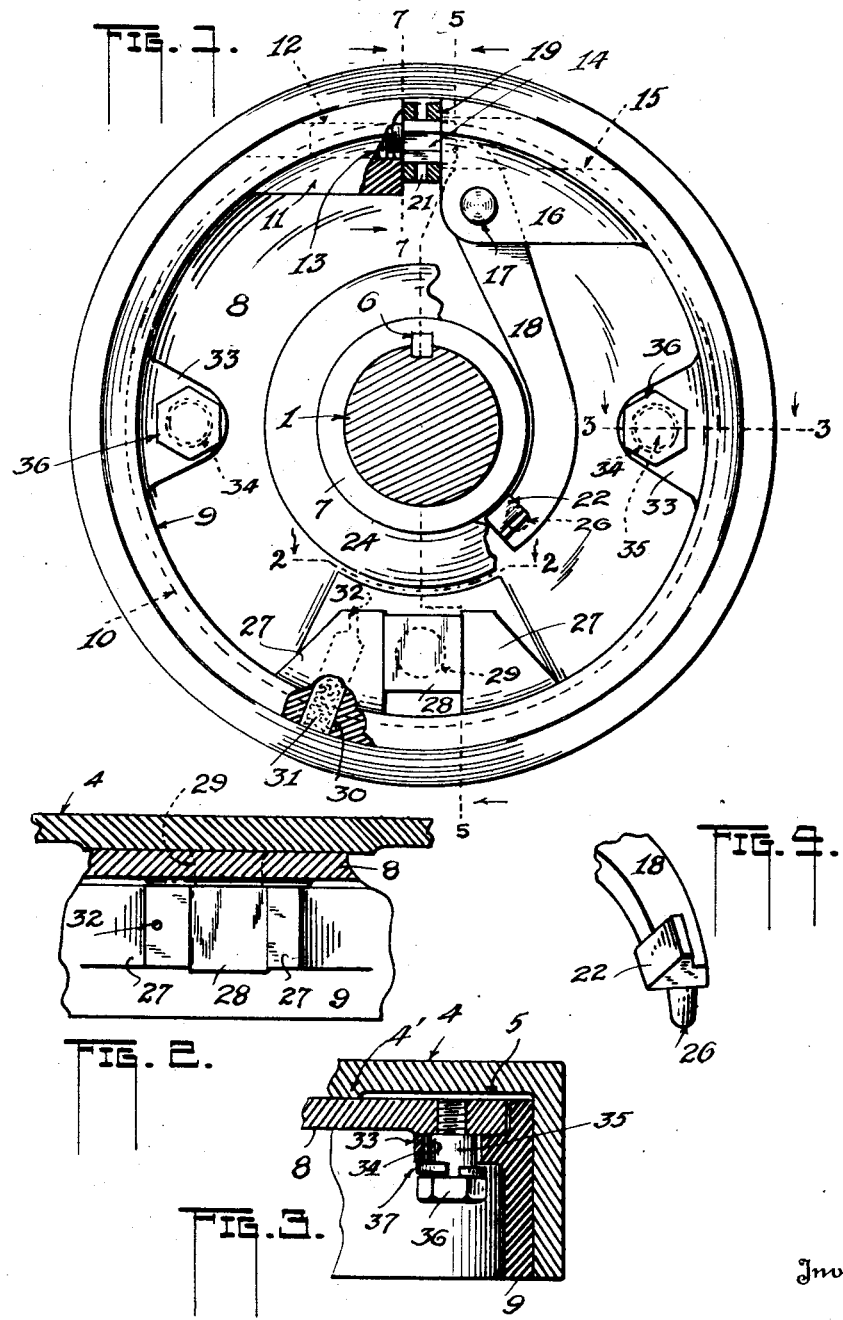
Inventor
W. E. Over,
By L. M. Thurlow
Attorney

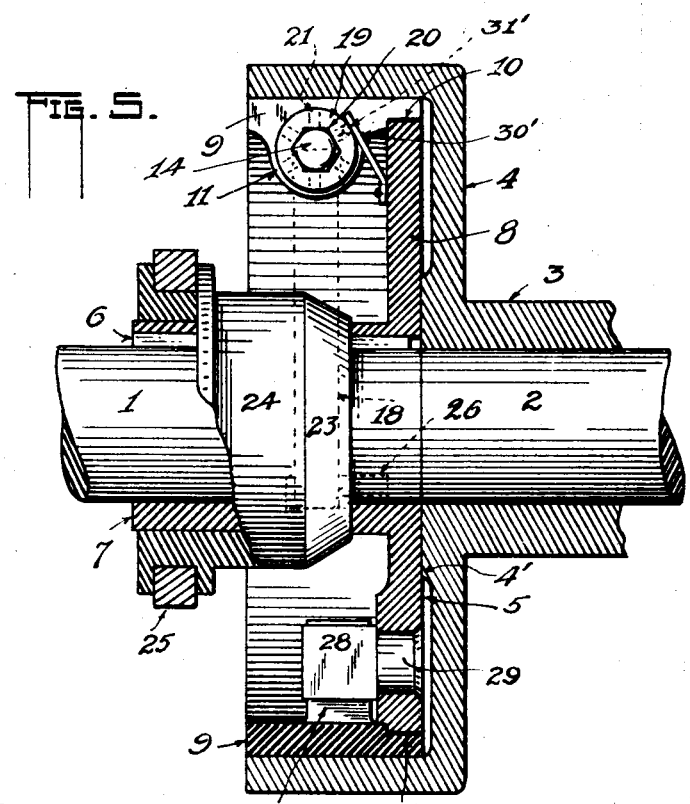
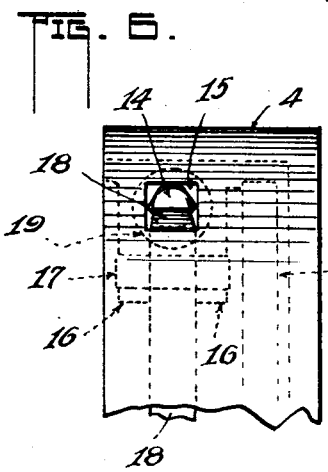
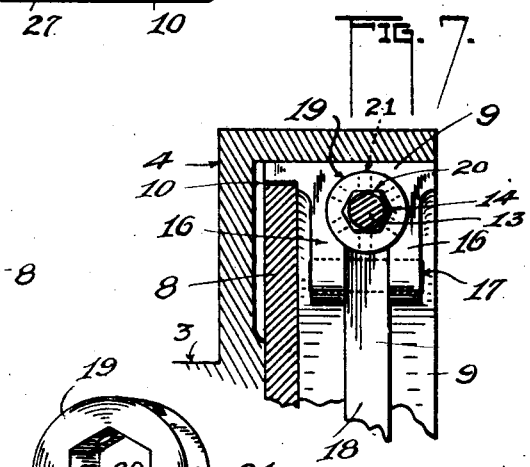
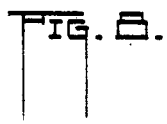

Patented July 16, 1929.

1,721,500

UNITED STATES PATENT OFFICE.

WILLIAM E. OVER, OF HAVANA, ILLINOIS, ASSIGNOR TO HAVANA MANUFACTURING CO., OF HAVANA, ILLINOIS, A CORPORATION OF ILLINOIS.

CLUTCH.

Application filed March 2, 1927. Serial No. 171,980.

This invention relates to clutches for general purposes. The main object of the invention is to provide in a clutch a clutch ring or friction ring free to "float" whereby it may centralize itself with respect to a clutch member with which it engages.

Another object is that of providing an expanding clutch ring free to float upon a supporting and driving member, and one that by reason of its form and construction will be free to expand and contract uniformly throughout whereby to engage over its entire surface with the clutch member with which it cooperates.

Another object of the invention is the provision of coacting parts carried by an expansible friction ring and associated driving member by means of which said ring while permitted a free floating action is positively driven.

Still another object is the provision of a clutch of compact form including an expansible ring and a novel means for adjusting the same in its relation to the friction surface of the clutch member which it is to engage.

These and other objects and advantages will be made clear from the following specification aided by the accompanying drawings showing a preferred form of structure and wherein, Figure 1 is a side elevation of a clutch involving the invention.

Figure 2 is a section on line 2—2, Figure 1, showing certain parts of a novel nature.

Figure 3 is a transverse section of parts of the clutch taken on line 3—3, Figure 1.

Figure 4 shows part of a ring-expanding arm or lever in perspective.

Figure 5 is a longitudinal section of the clutch on line 5—5 of said Figure 1.

Figure 6 is an elevation of a portion of the face of a clutch housing showing certain details of construction.

Figure 7 is a transverse section of a portion of the clutch housing, and a driving member together with parts as viewed on line 7—7, Figure 1, and Figure 8 is a ring or collar employed as an adjusting part in connection with the clutch-ring, the same being shown in perspective.

In Figure 5 the characters 1 and 2 designate a driving shaft and a driven shaft, respectively, said driven shaft having affixed thereto in any customary manner the hub 3 of a clutch-housing 4 having a cavity 5 to receive the other clutch portion now to be described. The said shaft 1 may extend into the cavity 5 and has secured thereon by a key 6, for example, a hub 7 which includes a plate 8 which preferably lies adjacent the wall of the housing 4 and may abut against a boss 4' of the latter.

The said plate 8 is of circular form, see dotted lines Figure 1, and its periphery is spaced from the inner friction surface of said housing 4, a friction ring 9 substantially filling the annular space thus created. Said ring is severed transversely as shown in said Figure 1, the resulting extremities being slightly spaced from one another. In addition, the ring is recessed circumferentially at 10 and receives more or less freely the edge of said plate 8. At one end the ring is provided with an enlargement 11 on its inner surface and this has a bore 12 lying in the plane of rotation, being threaded to receive a screw 13 provided, in this instance, with a head 14 of a hexagon form which may be entered into a bore 15 in the adjacent end of the ring. Spaced lugs 16 depend from the ring-end last mentioned, see Figure 6, and pivoted between them on a pin 17 is an arm or lever 18 the short end or nose of which is adapted to bear against said head 14, while the long end extends toward the hub 7 of the driving member 8.

Within the space between the ends of the ring is an adjusting member 19 in the form of a collar having a hole 20 corresponding in outline to the form of the screw-head 14 and passing over the same. Said collar is provided with a series of holes 21 into any one of which a suitable tool may be entered whereby to turn the screw in either direction. The said long end of the lever 18 has a beveled extension 22 adapted to receive the beveled end 23 of a shifting collar 24 slidable upon the hub 7, said collar being operated by any usual shifter, part of which is denoted at 25. The lever preferably has a lug 26 extending from one side, Figures 4 and 5, adapted to rest against the plate 8 of the driving member, this being employed to prevent strain on said lever when the collar 24 is brought into engagement with such lever during clutching action.

The ring 9 substantially opposite the described spaced ends thereof has a pair of spaced lugs 27 between which is the head 28 of a stud 29 secured in suitable manner in the plate 8, see Figure 5, it being noted that the spaced edges of the lugs parallel a line drawn midway between them and extending through the axis of clutch rotation. Preferably one of the lugs is bored at 30 to receive a wicking 31 which may be supplied with a lubricant at 32, for example, whereby the abutting friction surfaces of the ring 9 and housing 4 may be kept lubricated if desired.

Substantially midway between the said lugs 27 and the spaced ends of the ring, at opposite position, the said ring is provided with lugs 33 having bores 34 through which extend studs 35 secured in the plate 8 and shouldered against the same, said studs having head 36 spaced outwardly from the lugs, spring washers 37 being interposed between said heads and lugs as shown in Figure 3.

It is to be noted that the ring 9, by reason of its form, is free to flex throughout its entire length. That is to say, it is not tied together with bridging parts as are many devices of this class, but merely has the several lugs 27, 33 at widely spaced positions. Since free to flex at all points, therefore, practically its entire friction surface can readily be spread throughout and against the inner surface of the housing 4 thereby obtaining a maximum of clutching surface. The ring is permitted to have a free movement with respect to the member 8 due to the relation of the head 28 and the lugs 27 which latter have free movement radially, and due to the fact, also, that the lugs 33 are free to shift with respect to the heads 36 of the studs 35 as permitted by the spring washers 37 described, the latter merely controlling the ring to the extent that a too free movement is prevented.

The ring is, of course, adjusted to be normally free of the housing 4 so that there can be no drag between the two, this adjustment being possible through the manual turning of the collar 19 controlling the screw 13. If the ring is expanded so as to have too great a diameter the screw is turned to decrease the distance between the nose of the lever 18 and that end of the ring having the screw, permitting the ring to decrease in diameter. Contrariwise, the ring is expanded by movement of the screw in a reverse direction spreading the ring-ends and backing the screw against the nose of the lever. Since the screw lies between the enlargement 11 and lugs 16 close to the extremities of the ring a spreading of the latter in a uniform manner is made possible since both extremities are affected in like degree, there being no distortion of said ring. That is to say, the two halves are spread equally and in line with one another. The collar 19 can be operated to turn the screw 13 by inserting a nail or other like object into any one of the holes 21, no special wrench being required. The screw is held in any position it may be left through the engagement of a tit 31' on the free end of a spring 30' whose other end is attached to the plate 8, as in Figure 5, said tit permitting free adjustment of the collar but automatically engaging in any one hole and securing said collar and the screw from rotating.

The ring rotates with the plate 8, of course, since mounted on that member, and the lever since mounted in the path of the collar 24 will cause said ring to frictionally engage the housing 4 whenever said collar is shifted. When the collar is shifted sufficiently beneath the lever the latter will ride up and maintain its position upon the cylindrical portion of such collar and there remain until the collar is withdrawn. Due to the fact that the spring washers 37 are interposed between the heads 36 of the studs 35 and the lugs 33 the ring 9 is held against the plate 8 preventing rattling, yet permitting shifting movement of the latter two members relatively.

The structure provided throughout is simple since made up of few parts, it is compact so that it can be used in close quarters, and is easily and quickly adjusted, the adjusting means itself occupying but little space while thoroughly efficient. In addition, due to the construction of my clutch there are no rotating parts projecting from the open side thereof, or that side from which the smooth collar 24 extends, such as would tend to catch the clothing of the operator, the smooth collar not being such as to result in an occurence of that nature. Where clutches are used in exposed places such as on machine parts in general it is extremely important that projecting parts be not used. In hidden position, however, as for instance within tractor wheels and the like this is not necessarily required.

It is clear that though in the present instance the plate 8 and ring 9 constitute the driving parts and the housing the driven member, the relation may be reversed.

I claim:

1. A clutch including in its construction a rotatable member having a stud extending therefrom in a direction paralleling the axis of its rotation, a transversely severed clutch-ring lying adjacent the member and having spaced lugs lying opposite the place of severance and receiving the said stud slidably between them said ring also having a lug spaced from said spaced lugs and disposed substantially midway between said pair of lugs and the said place of severance of the ring, said lug overlying the member and having an opening therein, a stud extending from the member through the said opening, said stud being of smaller diameter than said opening to permit lateral shifting movement of said lug and stud relatively, said stud having a head outside the lug, and a compression spring interposed between the said head and said lug.

2. A clutch including in its construction a rotatable member having a stud extending therefrom in a direction paralleling the axis of its rotation, a transversely severed clutch-ring lying adjacent the member and having spaced lugs lying opposite the place of severance and receiving the said stud slidably between them, said ring also having lugs at two diametrically opposite points each midway the distance between the said spaced lugs and the place of severance of the ring, each said lug overlying the member and each having an opening through it, a stud carried by and extending from the member through the opening of each lug, the studs being of less diameter than said openings whereby the lugs and said studs are permitted lateral shifting movement relatively, and each lug having a head outside the lug, and a compression spring interposed between each head and the adjacent lug.

3. A clutch including a housing having a cylindrically curved inner friction surface, a separate clutch member comprising a ring having spaced ends and adapted to be spread into engagement with the said friction surface, there being a bore in said ring through each of said spaced ends, both bores being in alignment, the axes of the bores lying in the plane of rotation of the clutch and lying at right angles to a line passing between said ends of the ring and through the axis of rotation, and opening upon the friction surface of the ring, a screw threaded into one of the bores and having a collar thereon between the ends of the ring adapted for turning the said screw, said collar being fashioned to receive an operating member, means to hold the collar in adjusted positions, and a lever pivoted between its ends to one end of the ring, one of the ends of the lever extending into the other bore and abutting upon the free end of the screw in that bore.

4. A clutch including a housing having a cylindrically curved inner friction surface, a separate clutch member comprising a ring having spaced ends and adapted to be spread into engagement with the said friction surface, there being a bore in said ring through each of said spaced ends, both bores being in alignment, the axes of the bores lying in the plane of rotation of the clutch and lying at right angles to a line passing between said ends of the ring and through the axis of rotation, a screw threaded into one of the bores and having a collar thereon between the ends of the ring adapted for turning the said screw, said collar being fashioned to receive an operating member, means to hold the collar in adjusted positions, and a lever pivoted between its ends to one end of the ring, one of the ends of the lever extending into the other bore and abutting upon the free end of the screw in that bore.

In testimony whereof I affix my signature.

WILLIAM E. OVER.